A. TERESA.
HECKLING MACHINE.
APPLICATION FILED FEB. 2, 1914.
1,255,065.
Patented Jan. 29, 1918.
11 SHEETS—SHEET 7.
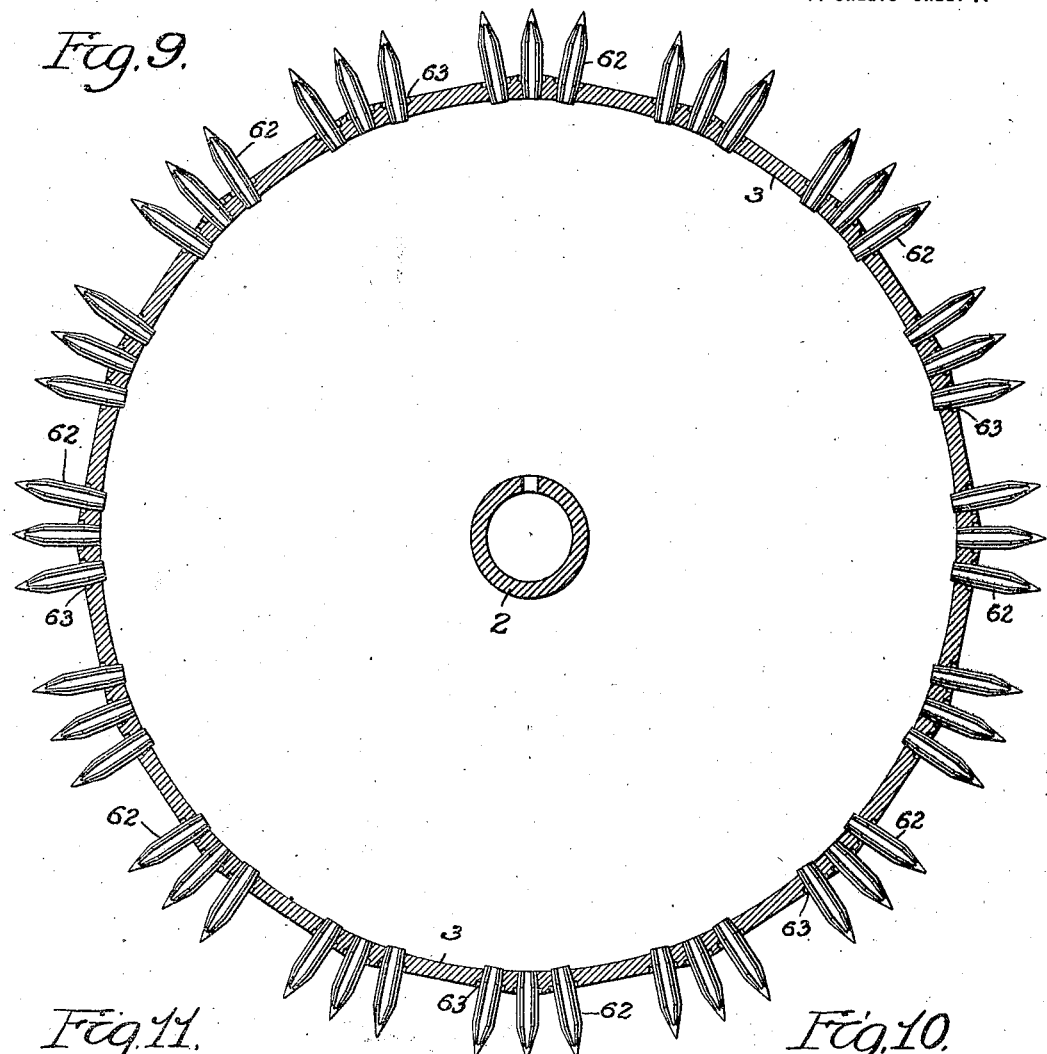
Fig. 9.
Fig. 11.
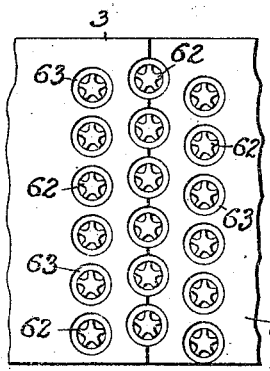
Fig. 12.
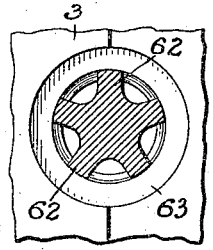
Fig. 10.
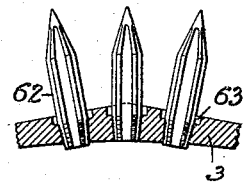
WITNESSES
INVENTOR
ANTONIO TERESA
BY HIS ATTORNEY
Harry Smith

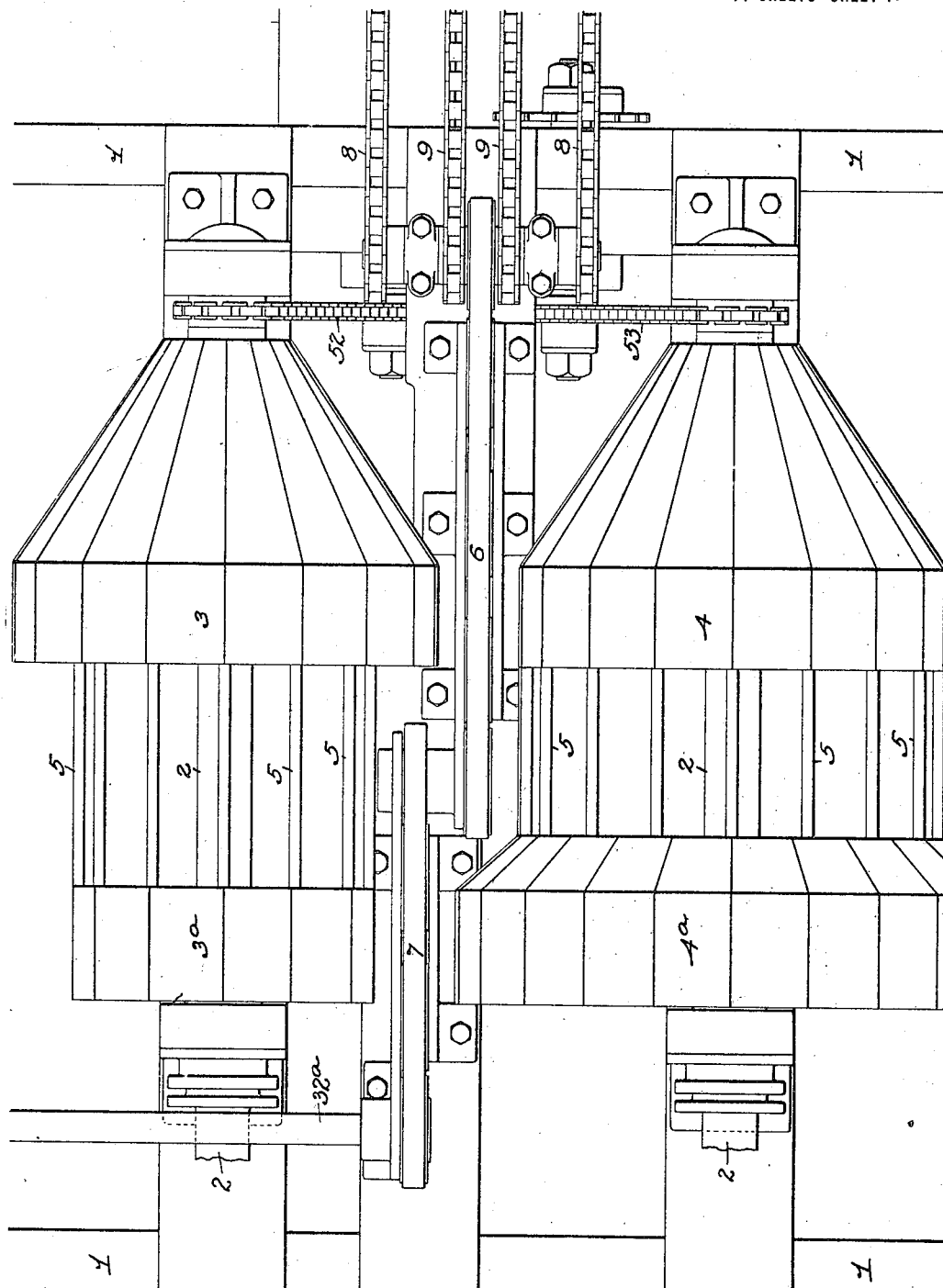

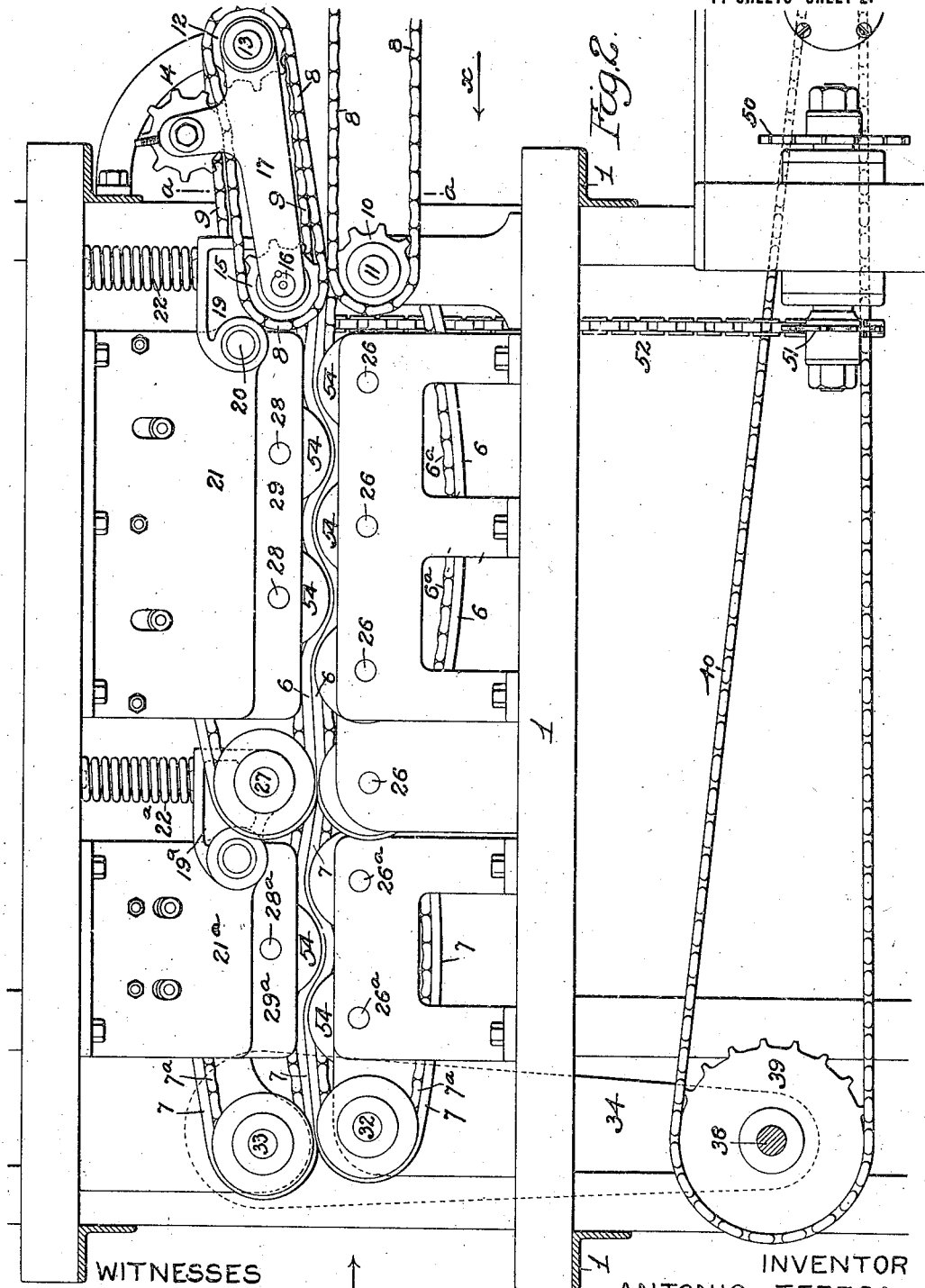

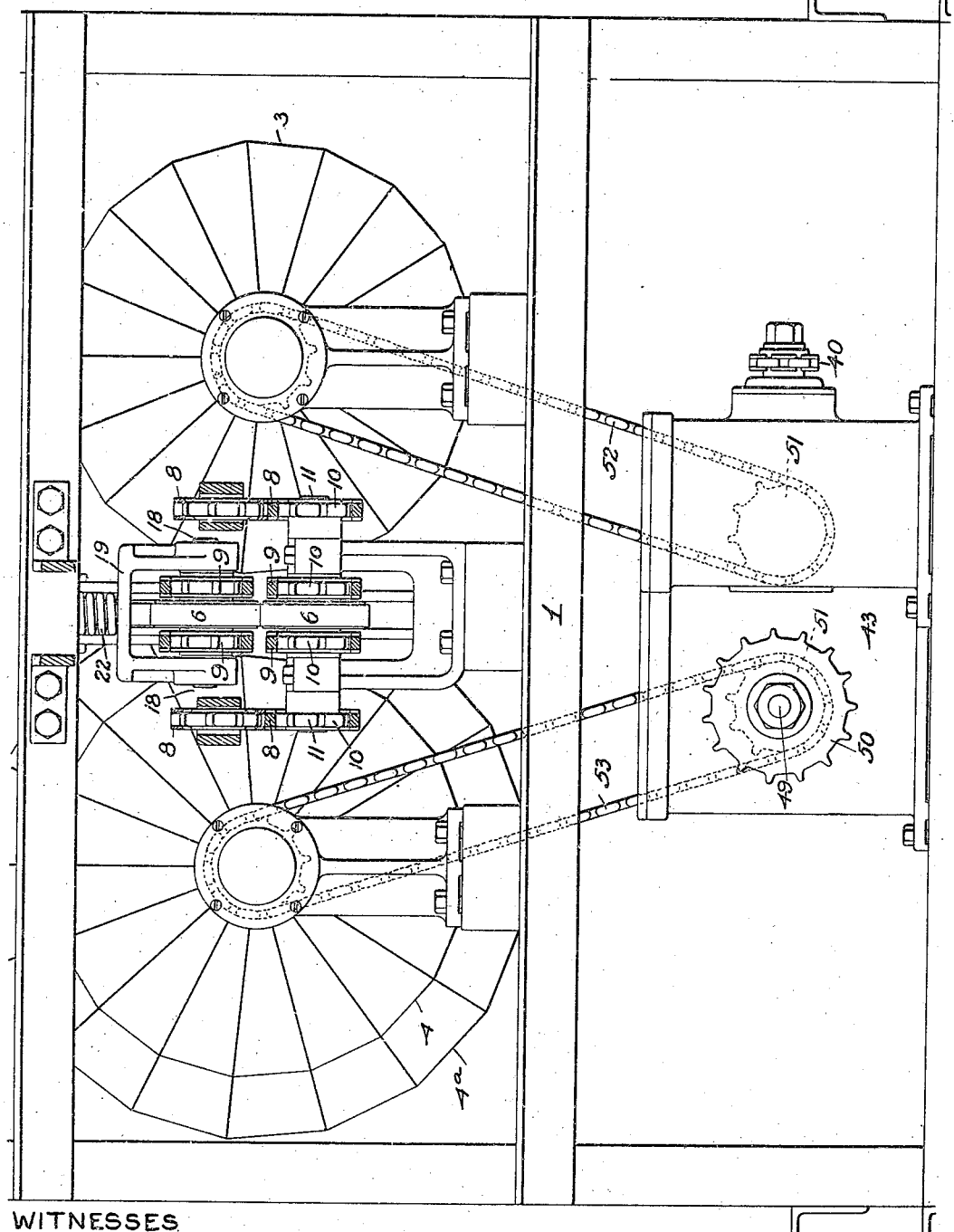

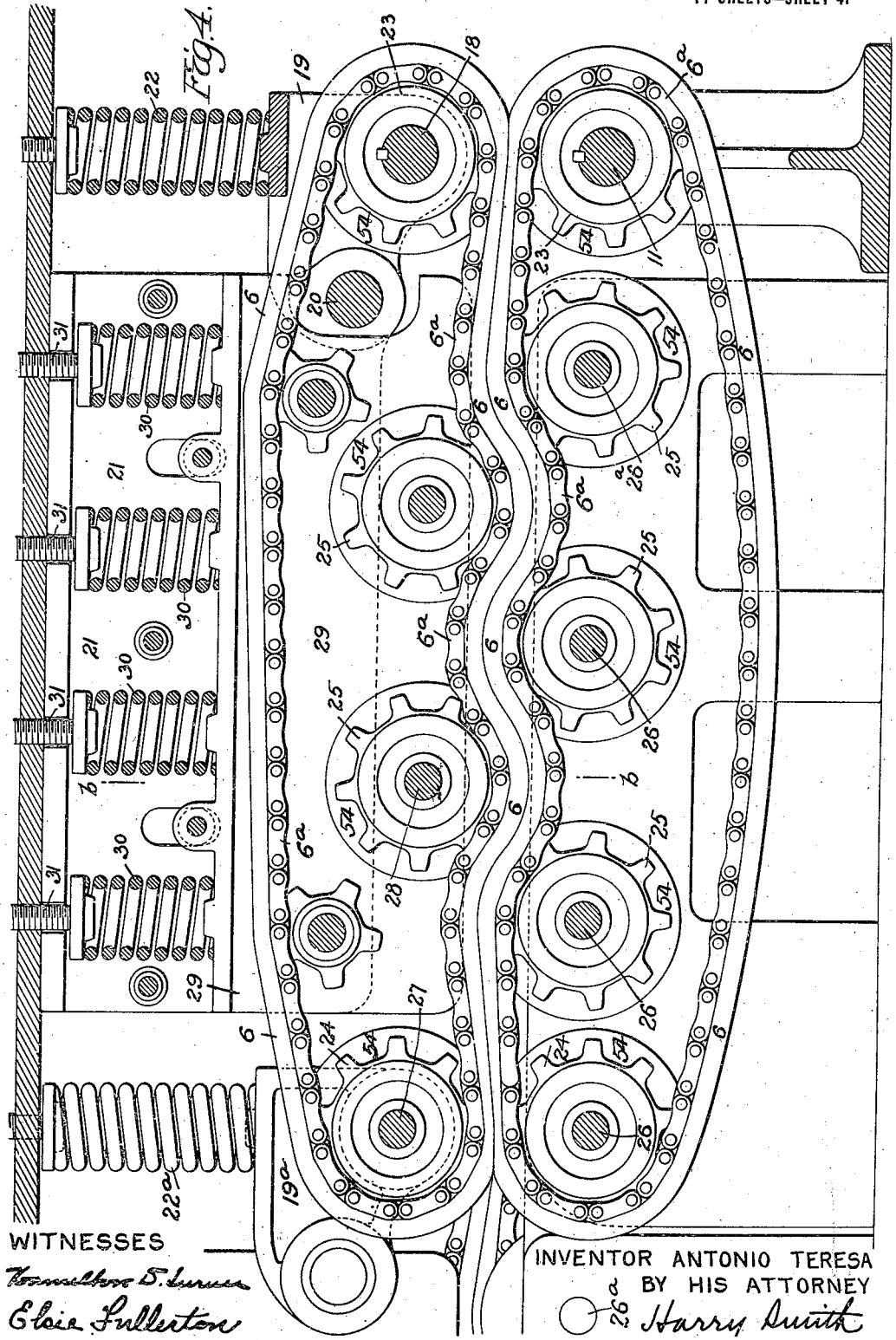

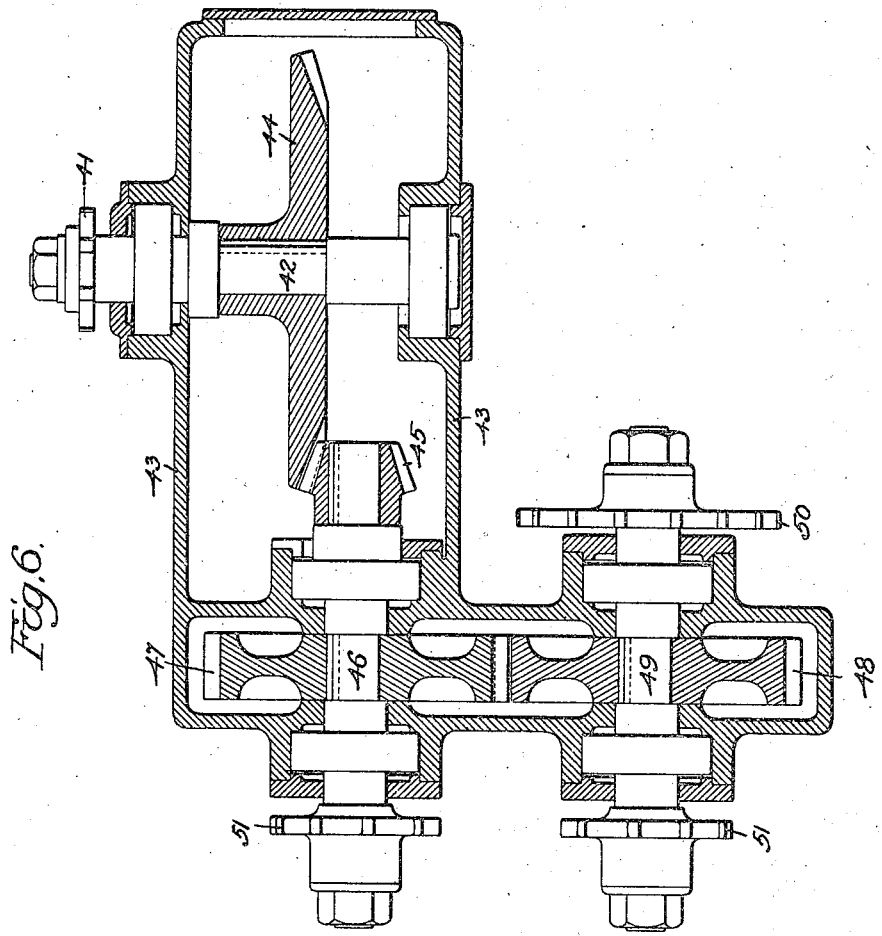

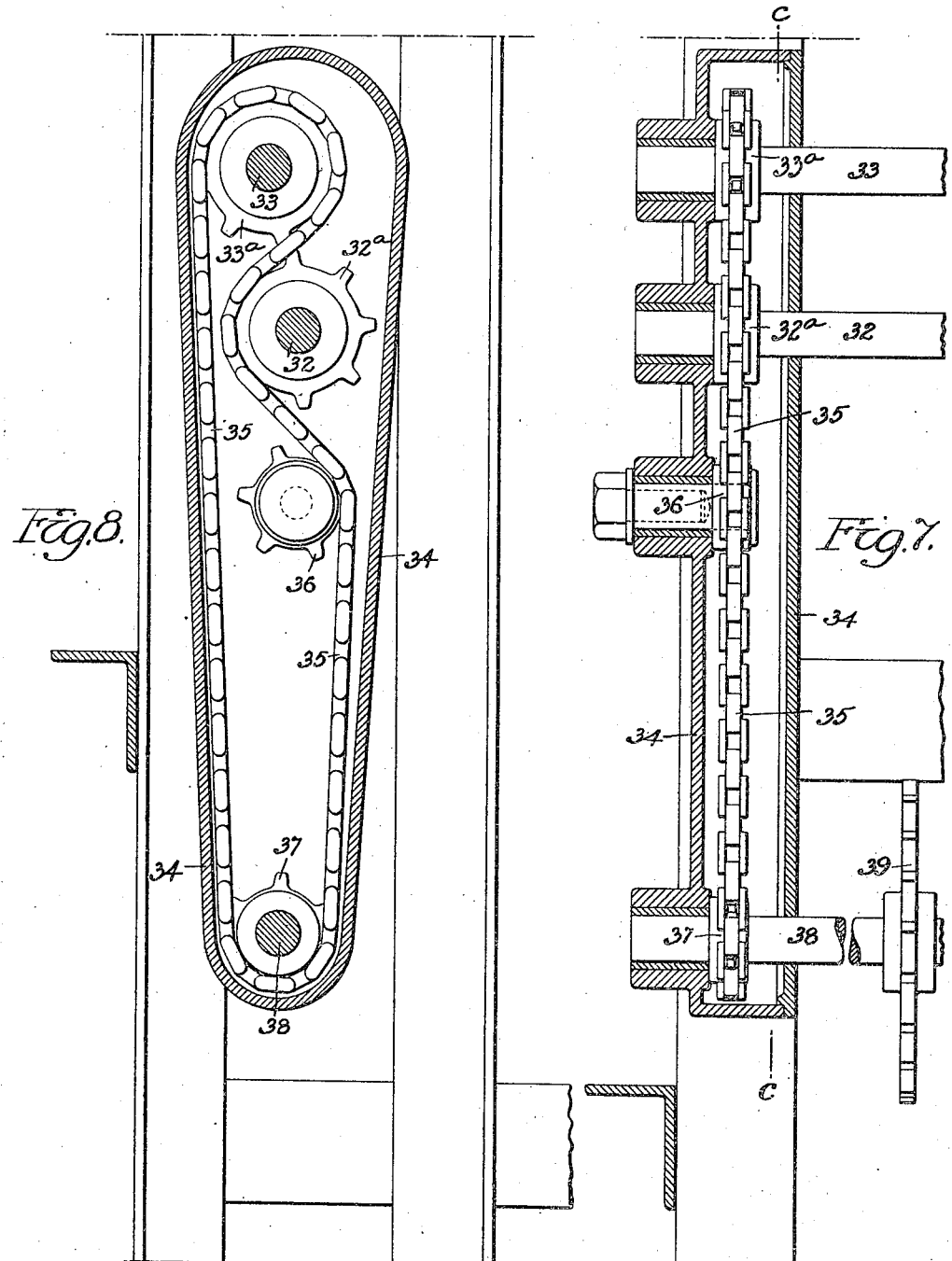

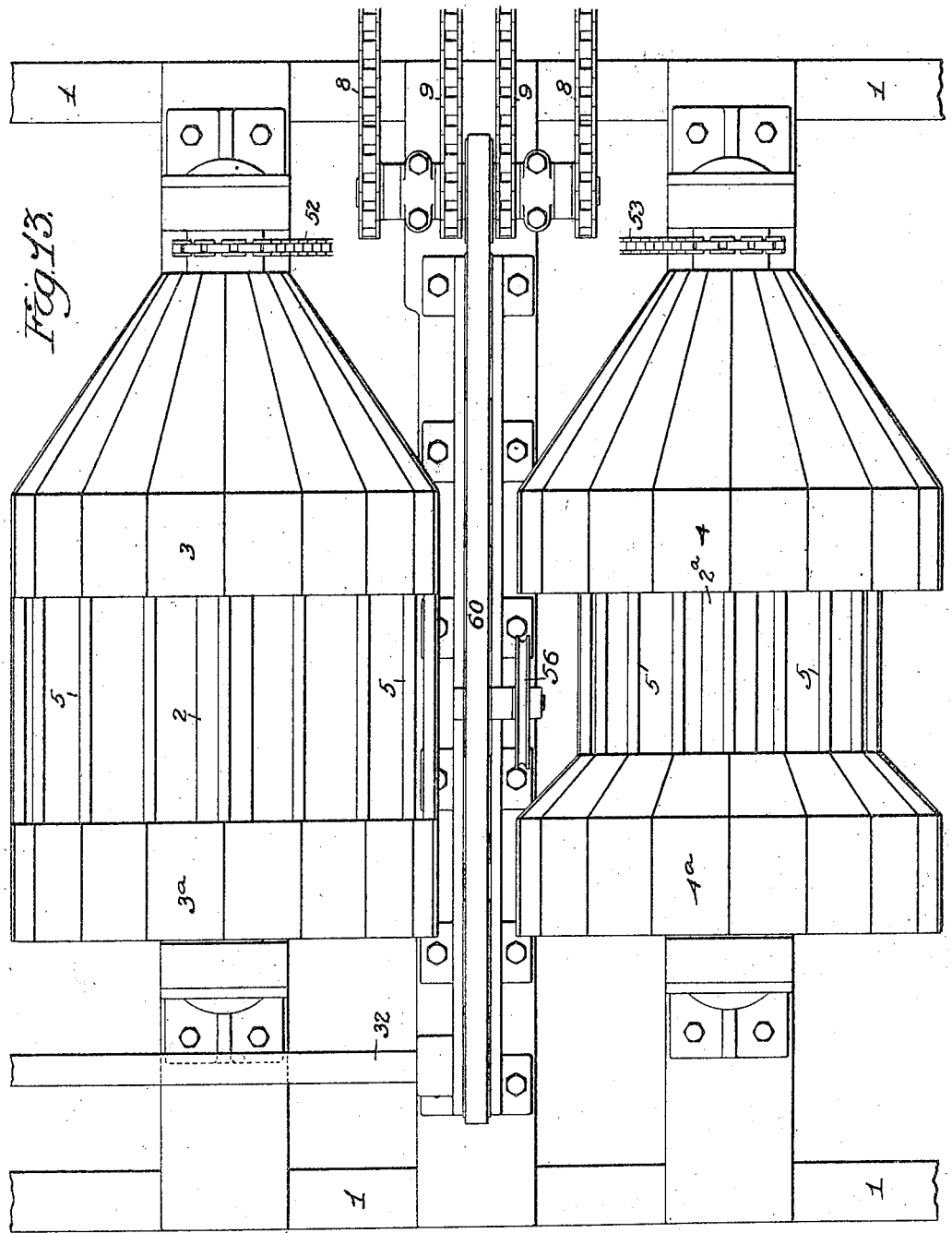

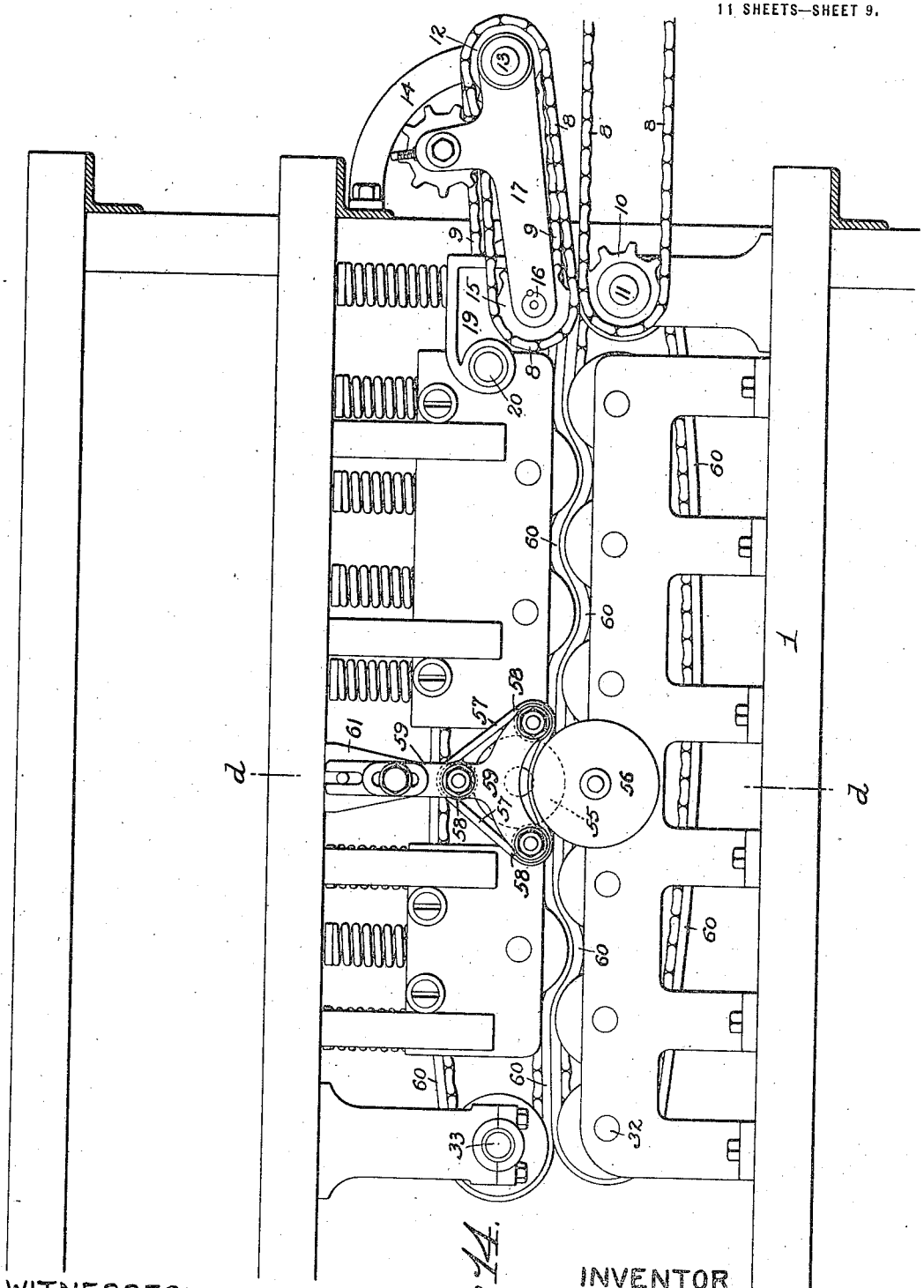

A. TERESA.
HECKLING MACHINE.
APPLICATION FILED FEB. 2, 1914.
1,255,065.
Patented Jan. 29, 1918.
11 SHEETS—SHEET 10.
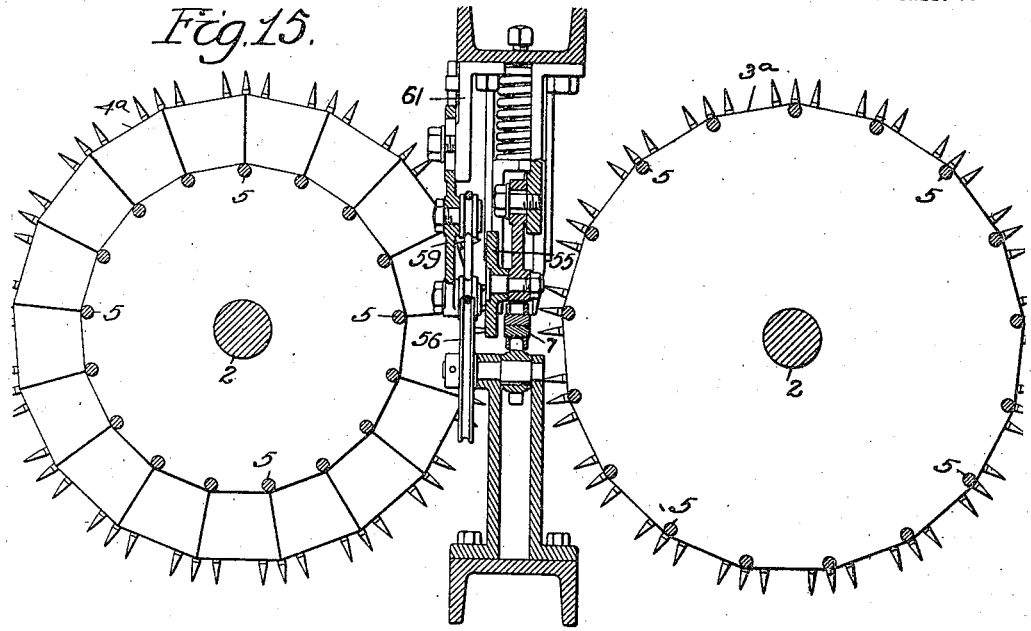
Fig. 15.
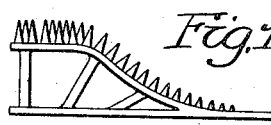
Fig. 16.
Fig. 18. Fig. 20. Fig. 22. Fig. 24. Fig. 26.
    
Fig. 19. Fig. 21. Fig. 23. Fig. 25. Fig. 27.
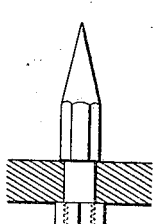 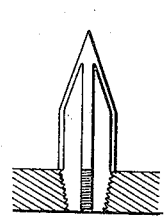 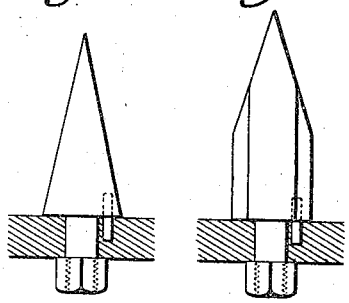
WITNESSES
Hamilton D. Turner
Elsie Fullerton
INVENTOR
ANTONIO TERESA
BY HIS ATTORNEY
Harry Smith

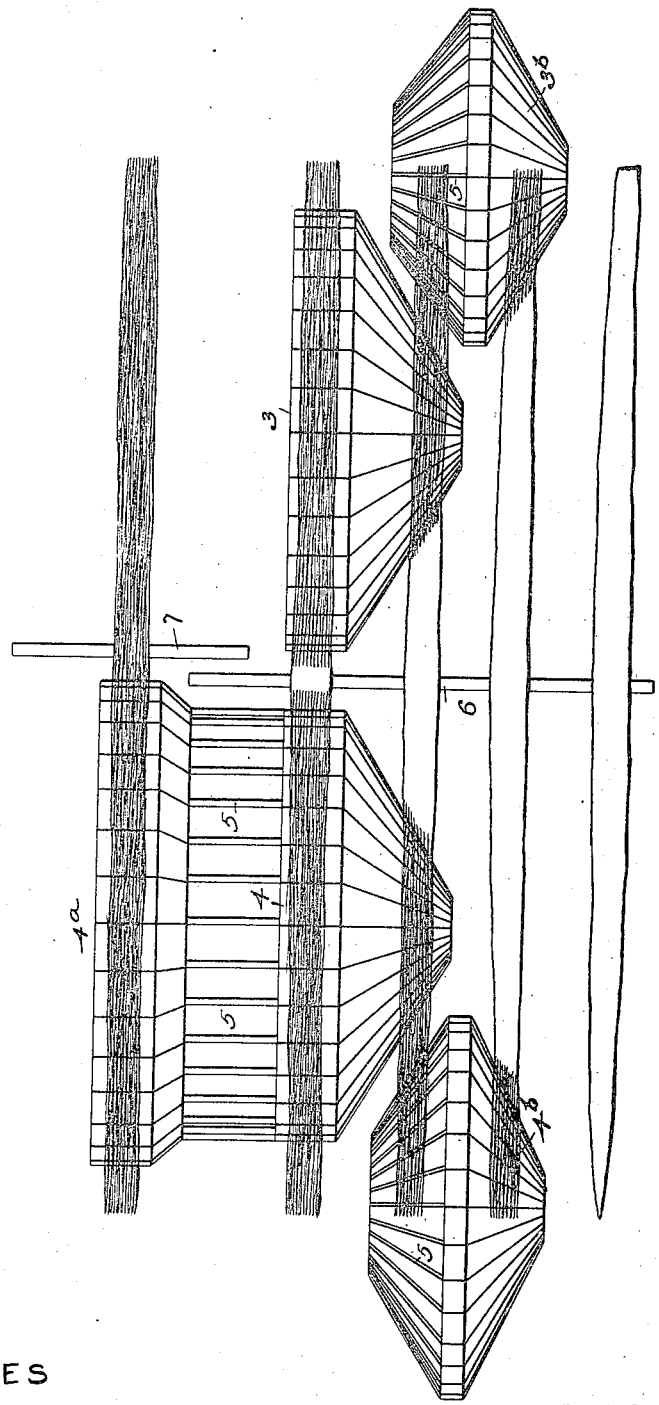

UNITED STATES PATENT OFFICE.

ANTONIO TERESA, OF PHILADELPHIA, PENNSYLVANIA.

HECKLING-MACHINE.

1,255,065.

Specification of Letters Patent.

Patented Jan. 29, 1918.

Application filed February 2, 1914. Serial No. 815,934.

*To all whom it may concern:*

Be it known that I, ANTONIO TERESA, a subject of the King of Spain, residing in Philadelphia, Pennsylvania, have invented certain Improvements in Heckling - Machines, of which the following is a specification.

The object of my invention is to provide an efficient heckling machine for removing the pulp from the fibrous portions of the leaves, stems, stalks, or other fiber-bearing portions of such plants, as sisal, Mexican aloe, etc., such portions being hereinafter, for convenience, referred to as "leaves."

This object I attain in the manner hereinafter set forth, reference being had to the accompanying drawings, in which—

Figure 1 is a plan view of a machine constructed in accordance with my invention with the upper feed chains and conveyer aprons and their driving devices removed and the heckling drums shown as without teeth, in order to prevent the confusion which would attend any attempt to properly show the teeth on drums of the relatively small scale shown in this figure;

Fig. 2 is a side elevation of the machine with the drum on the near side removed;

Fig. 3 is a view, partly in transverse section on the line $a$—$a$, Fig. 2, but mainly in end elevation, looking in the direction of the arrow $x$ Fig. 1;

Fig. 4 is a longitudinal section, on an enlarged scale, of one set of conveyer aprons and their carrying and driving devices;

Fig. 5 is a transverse section on the line $b$—$b$, Fig. 4, of the upper apron and its carrying devices;

Fig. 6 is a horizontal section, on a larger scale than Figs. 1, 2 and 3, of the main gear box and of the gearing which receives the power from the motor and transmits it to the other parts of the machine;

Fig. 7 is a transverse section, likewise on a larger scale than Figs. 1, 2 and 3, and looking in the direction of the arrow $y$ Fig. 2, of the gear box and gearing for transmitting motion to the feed chains and the conveyer aprons of the machine;

Fig. 8 is a longitudinal section of the same, on the line $c$—$c$, Fig. 7;

Fig. 9 is a transverse section, on an enlarged scale, of one of the cleaner drums of the machine showing the same provided with teeth;

Fig. 10 is a transverse section, on a larger scale than Fig. 9, of part of the drum carrying a group of teeth;

Fig. 11 is a face view of part of the drum, on the same scale as Fig. 10, showing the disposition of the teeth of the group;

Fig. 12 is a horizontal section, on a still larger scale, of one of the teeth and of that portion of the drum which carries the same;

Fig. 13 is a view similar to Fig. 1, but illustrating a construction in which a single pair of conveyer aprons is employed in place of the two pairs shown in Fig. 1;

Fig. 14 is a side elevation of the machine shown in Fig. 13 with the drum on the near side removed;

Fig. 15 is a transverse section on the line $d$—$d$, Fig. 14;

Fig. 16 is a side elevation of one of an endless chain of toothed bars which may in some cases be used in place of a toothed drum in the machine;

Fig. 17 is a diagrammatic representation of conveyer aprons and drums, as disposed for the treatment of very long leaves, and Figs. 18 to 27 are views of various modified forms of teeth which may be used within the broader scope of my invention.

My improved machine may be said to consist, in its essential features, of conveyer aprons which engage the leaf about midway of its length and carry it, in a direction transverse to said length, past toothed heckling drums which commence to act upon the leaf at and near the opposite ends of the same and gradually work toward the middle of the leaf, whereby the pulp is scraped away a little at a time from the fibrous portion of the leaf, the scraping action advancing from the ends of the leaf toward the middle of the same, "middle" in this case usually meaning a point about equidistance from the opposite ends of the leaf. Provision is also made for laterally shifting the grip of the conveyer aprons so as to provide for the cleaning of that portion of the leaf which was formerly gripped between said aprons.

Referring in the first instance to Figs. 1 to 8 of the drawings, 1 represents parts of the fixed frame having bearings for the shafts 2 of a pair of toothed heckling drums 3 and 4, preferably polygonal in cross section, and tapering at their forward ends. Each of these drums also carries a rear drum $3^a$ or $4^a$, preferably (for the purpose of reducing weight) supported by means of an intervening openwork or skeleton structure consisting of connecting rods 5, the drums 3ª and 4ª being likewise of polygonal cross section, and the drum 4ª being tapered in its forward portion and of larger diameter than the drum 4, as shown in Fig. 1.

Disposed between the pair of drums are two pairs of conveyer aprons 6 and 7 which are in different longitudinal planes and overlap one another, as shown in Fig. 1. In connection with these conveyer aprons there are employed at the receiving end of the machine a series of pairs of feed chains 8 and 9 between which the leaves are first inserted and by which they are carried to the forward ends of the conveyer aprons 6. The inner ends of the lower feed chains 8 and 9 are carried by sprocket wheels 10 on a shaft 11 which is mounted in fixed bearings in the frame of the machine and the outer ends of said lower feed chains may be likewise carried by sprocket wheels mounted in fixed bearings.

The upper feed chains 8 and 9 are, however, shorter than the lower feed chains, and the rear ends of said upper feed chains 8 and 9 are carried by sprocket wheels 12 secured to a shaft 13 which is free to turn in brackets 14 projecting from the end frame of the machine, as shown in Fig. 2. The forward ends of the feed chains 8 are carried by sprocket wheels 15 rotatably mounted on shafts 16 which are fixedly secured to swinging hangers 17 pivotally mounted upon the shaft 13 so that the upper chains 8 are free to rise and fall to accommodate differences in the thickness of the leaves, the weight of the upper chains 8 and their hangers being sufficient to maintain said chains in contact with the leaves. The forward ends of the chains 9 are carried by sprocket wheels on a shaft 18 mounted so as to be free to turn in a yoke 19 pivotally mounted at 20 upon certain spring boxes 21 on the fixed frame and these yokes are acted upon by coiled springs 22 whereby they are depressed.

The upper and lower conveyer aprons 6 are each mounted upon an endless chain 6ª which is carried by end sprocket wheels 23 and 24, the lower chain passing over and the upper chain passing under intermediate sprocket wheels 25. The sprocket wheel 23 for the lower chain is mounted upon the shaft 11 and the sprocket wheel 23 for the upper chain is mounted upon the shaft 18. The sprocket wheels 24 and 25 for the lower chain are mounted upon shafts 26 adapted to fixed bearings in the frame, as shown in Fig. 4. The sprocket wheel 24 for the upper chain is carried by a shaft 27 mounted in a swinging yoke 19ª similar to that which carries the shaft for the sprocket wheel 23, and depressed in like manner by a coiled spring 22ª, as shown in Fig. 4.

The sprocket wheels 25 and also certain idle wheels for the upper chain 6ª are mounted upon shafts 28 carried by a box 29 which is mounted so as to be free to move vertically in the spring box 21 and is depressed by means of springs 30 interposed between it and adjusting screws 31 adapted to threaded openings in the upper member of the fixed frame. (See Figs. 4 and 5).

The conveyer aprons 7 are mounted upon endless chains 7ª the lower chain being adapted at its rear end to a sprocket wheel on the foremost shaft 26 and the upper chain being adapted at its rear end to a sprocket wheel on the shaft 27. At its forward end the lower chain 7ª passes around a sprocket wheel on a shaft 32 and the upper chain passes around a sprocket wheel on a shaft 33 and between the ends the lower chain 7ª passes over sprocket wheels mounted upon shafts 26ª adapted to bearings in the fixed frame, while the upper chain 7ª passes under a sprocket wheel turning on a shaft 28ª carried by a vertically movable box 29ª sliding in a spring box 21ª and acted upon by springs in the same manner as the box 29 in the spring box 21.

The aprons 6 are composed of rubber or other elastic or semi-elastic material so as to grip the leaves without bruising the same and the sprocket wheels for the upper and lower chains 6ª and 7ª are so disposed that the contacting runs of the aprons will follow a waved course, as shown in Figs. 2 and 4, and thus insure a firmer grip upon the leaves than if they followed a straight course.

The various sprocket wheels have side flanges 54 which project beyond the teeth of said wheels, and overlap the aprons 6 and 7 so as to laterally confine and guide said aprons.

Rotating movement imparted to the shafts 32 and 33 is transmitted first to the chains 7ª and their aprons 7, then to the chains 6ª and their aprons 6, and then to the lower feed chains 8 and 9 and to the upper feed chains 9. The shafts 32 and 33 are provided, inside of a gear box 34 (Figs. 7 and 8) with sprocket wheels 32ª and 33ª around which passes a chain belt 35, which also passes over an idler wheel 36 and around a driving sprocket wheel 37 in the lower portion of the case, said driving sprocket wheel being mounted upon a shaft 38, which, on the outside of the case, is provided with a sprocket wheel 39 connected by a chain belt 40 to a sprocket wheel 41 on a shaft 42 mounted in bearings in the main gear case 43 (Fig. 6). The shaft 42 is provided with a bevel wheel 44 which meshes with a bevel pinion 45 on a shaft 46 disposed at a right angle to the shaft 42 and adapted to bearings in the case 43, said shaft 46 having a spur pinion 47 which meshes with a similar pinion 48 on a shaft 49 parallel with the shaft 46. The shaft 49 is provided with a sprocket wheel 50 which is driven by means of a suitable chain belt from any available source of power, and each of the shafts 46 and 49 is provided with a sprocket wheel 51, one of these sprocket wheels being geared by a chain 52 to a sprocket wheel on the shaft of the drum 3 and the other by means of a chain belt 53 to a sprocket wheel on the shaft of the drum 4.

Leaves laid between the upper and lower feed chains 8 and 9 will be carried thereby into the grip of the upper and lower conveyer aprons 6 and drawn forward by the latter into range of the toothed drums 3 and 4. The leaf will travel through the machine in line practically with the axes of the drums 3 and 4 and as the leaves will first come into contact at their ends with the teeth of the drums at the contracted forward ends of the latter the pulp will be scraped or torn away from the fibrous portion of the leaf at the ends of the latter. As the movement of the leaf through the machine continues and the diameter of the drums increase this scraping or tearing action will progress from the end of the leaf toward the middle of the same which is clamped between the conveyer aprons 6—6, the teeth upon the larger diameters of the drums finally engaging the leaf close up to the aprons 6—6, just before they deliver the leaf to the aprons 7—7. These latter aprons being in a plane laterally beyond that of the aprons 6 will engage a portion of the leaf which has been already cleaned and the portion formerly clamped between the aprons 6 will be exposed for the action of the supplementary drum 4ª, which being of greater diameter than the drum 4 overlaps the plane of the aprons 6 and effects the cleaning of the pulp from the portion of the leaf formerly confined by said conveyer.

In Figs. 13, 14 and 15 I have illustrated a construction of machine in which a single pair of conveyer aprons 60 takes the place of the two pairs of aprons shown in Fig. 1, this single pair of conveyer aprons being combined with devices whereby, at a certain stage in its progress, the leaf is drawn laterally from between the aprons to such an extent as to expose the portion formerly held between said aprons to the action of the teeth of the supplementary drum 4ª, which in this case need not be of any greater diameter than the drum 4.

The means for effecting the lateral withdrawal of the leaf from between the aprons 60 are a pair of disks 55 and 56 disposed alongside of said aprons and laterally separated from one another, the disks overlapping one another, as shown in Fig. 15. The disk 56 is grooved for the reception of a belt 57 which passes over the top of said disk 56 and around sheaves 58 carried by a forked frame 59 which is mounted so as to be vertically adjustable on a bracket 61 depending from one of the upper members of the fixed frame of the machine. As the leaf approaches the disks 55 and 56 it is caused to pass under the disk 55 and over the disk 56, being held in contact with the latter by the belt 57.

The deflection of the leaf from the relatively straight course which it formerly assumed causes a lateral draft upon it which has the effect of drawing it from between the aprons 60 and disposing the portion of the leaf formerly held between said aprons so far to one side of the same as to bring it within the range of the teeth of the drum 4ª, which finish the cleaning of the leaf. At the point where the leaf is drawn from between the aprons, the latter pursue a straight horizontal course so as to facilitate such withdrawal.

Although I prefer in all cases to use toothed drums, endless chains of toothed bars, such for instance as shown in Fig. 16, may in some cases be used in place of these drums, the chain traveling in the same direction as the periphery of the drum and each toothed bar of the chain having an inclined portion, as shown in Fig. 16, so as to cause the teeth to act first upon the end portions of the leaves and to progress toward the central portion of the same. Such an endless chain is therefore to be considered as within the scope of the word "drum" as used in my claims.

Where the leaves are of exceptional length I may use an arrangement of drums such as shown in Fig. 17, drums 3ᵇ and 4ᵇ being disposed laterally beyond the drums 3 and 4 so as to act upon the extreme ends of the leaves.

Referring now to Figs. 9 to 12, of the drawings, it will be noted that the teeth of the drums are disposed in groups or sets around the drum, each group consisting of a plurality of rows of teeth, one row disposed preferably at an angle of the polygonal face of the drum and another row on each side of the same, as shown in Figs. 9, 10 and 11. The teeth of one row are disposed so as to be out of line with the teeth of the adjoining row or rows and overlap the same, as shown in Fig. 11, and the teeth of one group bear such relation to those of the other groups, that the teeth will, in the aggregate, cover the entire area of the leaf, so that the fibers on leaving the machine will be thoroughly cleaned from adhering matter and will be in condition for immediate further use.

Each tooth is of polygonal cross section, as to its body portion and tapers at its outer end to a point, the cross section of tooth which I prefer being one having a series of radiating ribs 62 with relatively wide peripheral portions presenting a cutting or scraping edge on each side of the rib, as shown in Fig. 12, the bases of the teeth being threaded for engagement with threaded openings formed in the drum for their reception, and the grooves between the ribs of the teeth extending down to the base of the same, as shown in Fig. 10, so as to communicate with the interior of the drum.

Where each tooth is secured to the drum a countersink 63 is formed in the face of the drum so as to prevent the fibers of the leaves from being caught in the angle where the tooth adjoins the drum, thus preventing the fibers from being torn or otherwise mutilated.

The shaft 2 of the drum is hollow for receiving a supply of water and is perforated, as shown in Fig. 9, for the escape of this water into the drum, the water, on escaping from the shaft, being thrown out by centrifugal force against the inner wall of the drum and escaping through the grooves of the teeth so as to wash away from said teeth, and from the fibrous portions of the leaves, the pulp which they have scraped from said fibers, thereby not only providing a self-cleaning tooth but also insuring the washing of the fibers as the pulp is freed therefrom.

Other forms of tooth may, however, be employed without departing from the broader features of my invention. For instance in Figs. 18 and 19 I have shown in section and side view, respectively, a tooth of hexagonal cross section, in Figs. 20 and 21 a tooth of pentagonal cross section, in Figs. 22 and 23 a tooth of cruciform cross section, in Figs. 24 and 25 a tooth of oblong cross section presenting four flat faces, and in Figs. 26 and 27 a tooth of oblong cross section presenting two flat faces and two beveled faces, all of the teeth being beveled to a point at their outer ends.

Owing to the fact that but a small area of the leaf at a time is subjected to the action of the cleaning teeth of the drums, and to the further fact that the pulp is cleared away from one portion of the leaf before the adjoining portion is acted upon, the strain upon the teeth and drums is reduced to the minimum, thereby permitting the use of relatively light drums and reducing the amount of power necessary to drive the machine.

It will be evident that a drum need be used on but one side of the conveyer where it is desired to clean but one portion of a leaf, or a drum first on one side and then on the other side when it is desired to clean but one half of the leaf at a time, but I prefer to dispose the drums on opposite sides of the conveyer so as to act simultaneously upon the leaf, for not only is the operation of the machine thus materially expedited but what is of more importance strain upon the leaf is exerted in opposite directions, and there is therefore no tendency to draw the leaf laterally from between the aprons, as when but a single drum is used and the pull upon the leaf is all in one direction.

By reason of the polygonal cross section of the drums the portions of the leaves which overhang said drums are subjected to a constant lifting and dropping action, which serves to aid in freeing the pulp from the fibers if the leaves are treated after the pulp has become dry.

I claim:

1. The combination, in a heckling machine, of means for carrying the leaves forwardly in a direction transverse to their length, and a heckling drum of frusto-pyramidal form rotating in a direction transverse to the direction of movement of the leaves and having at the points of meeting of the sides of the pyramid projecting teeth for acting upon portions of the leaves which project laterally from the conveyer.

2. The combination, in a heckling machine, of means for carrying the leaves forwardly in a direction transverse to their length, and heckling drums disposed one on each side of said conveyer, said heckling drums rotating in a direction transverse to the direction of movement of the leaves, being of frusto-pyramidal form, and having at the points of meeting of the sides of the pyramid projecting teeth, those of one drum acting upon those portions of the leaves which project in one direction from the conveyer and the teeth of the other drum acting upon those portions of the leaves which project in the opposite direction from said conveyer.

3. The combination, in a heckling machine, of means for carrying the leaves forwardly in a direction transverse to their length, and a heckling drum disposed alongside of said conveyer and rotating in a direction transverse to the direction of movement of the same, said heckling drum being of polygonal cross section and having a portion of frusto-pyramidal form to which the leaf is first presented, and said polygonal and pyramidal portions of the drum having at the meeting points of their respective faces projecting teeth for acting upon the leaf.

4. The combination, in a heckling machine, of means for carrying the leaves forwardly in a direction transverse to their length, and heckling drums disposed one on each side of said conveyer and each rotating in a direction transverse to the direction of movement of said conveyer, each of said drums being polygonal in cross section, and each having a frusto-pyramidal portion to which the leaf is first presented, and said polygonal and pyramidal portions of the drum having at the meeting points of their respective faces projecting teeth for acting upon the leaf.

5. The combination, in a heckling machine, of a conveyer for carrying the leaves forwardly in a direction transverse to their length, heckling drums flanking said conveyer, and means for drawing the leaf laterally through the conveyer at one point in its travel, said means comprising a clamping device for the leaf laterally separated from the conveyer, and a deflector interposed between the conveyer and said clamping device and serving to bend that portion of the leaf which normally bridges the space between the conveyer and the clamping device and thereby increase the length of leaf necessary to bridge said space.

6. The combination, in a heckling machine, of a conveyer for carrying the leaves forwardly in a direction transverse to their length, a heckling drum flanking said conveyer and having active and inactive portions following each other in the direction of travel of the leaf, and means in line with said inactive portion of the heckling drum for drawing the leaf laterally to a certain extent from between the conveyer aprons.

7. The combination, in a heckling machine, of a pair of conveyer aprons carrying the leaf through the machine in a direction transverse to its length, heckling drums flanking said conveyer, laterally separated and overlapping disks on one side of said conveyer, and means for clamping the leaf to the outermost of said disks as it is carried forward by the conveyer aprons, whereby the projecting portion of the leaf will be deflected by said disks and the lateral position of the leaf in respect to the conveyer aprons will be shifted.

8. The combination, in a heckling machine, of the conveyer for carrying the leaf through the machine in a direction transverse to its length, and a heckling drum flanking said conveyer and having groups of teeth each consisting of a plurality of longitudinal rows, the teeth of one row being out of line with but overlapping the teeth of the adjoining row or rows.

9. The combination, in a heckling machine, of the conveyer for carrying the leaf through the machine in a direction transverse to its length, and a heckling drum flanking said conveyer, said heckling drum being of polygonal cross section and having groups of teeth composed of longitudinal rows some disposed along the angles of the polygonal face of the drum and others on each side of the same.

10. The combination, in a heckling machine, of the conveyer for carrying the leaf through the machine in a direction transverse to its length, and a heckling drum flanking said conveyer, said heckling drum consisting of a hollow shell having projecting teeth for acting on the leaf, said teeth having grooved faces and said grooves extending to the interior of the drum so as to provide passages from the interior to the exterior of the drum through said grooved faces of the teeth.

In testimony whereof, I have signed my name to this specification, in the presence of two subscribing witnesses.

ANTONIO TERESA.

Witnesses:
KATE A. BEADLE,
HAMILTON D. TURNER.

Copies of this patent may be obtained for five cents each, by addressing the "Commissioner of Patents, Washington, D. C."